United States Patent [19]

Gargiulo

[11] Patent Number: 5,385,173
[45] Date of Patent: Jan. 31, 1995

[54] PIPE LINER COMPOSITION

[75] Inventor: Joseph L. Gargiulo, Colts Neck, N.J.

[73] Assignee: American Pipe & Plastics, Inc., Binghamton, N.Y.

[21] Appl. No.: 69,570

[22] Filed: May 28, 1993

Related U.S. Application Data

[63] Continuation-in-part of Ser. No. 753,797, Sep. 3, 1991, abandoned.

[51] Int. Cl.$^6$ ............................................. F16L 55/165
[52] U.S. Cl. ........................................ 138/98; 138/118; 138/DIG. 7; 138/141
[58] Field of Search ................. 138/97, 98, 140, 141, 138/145, 146, DIG. 7, 118

[56] References Cited

U.S. PATENT DOCUMENTS

| | | | |
|---|---|---|---|
| 3,968,552 | 7/1976 | Hunter | 138/98 |
| 3,968,553 | 7/1976 | Hunter | |
| 4,018,983 | 4/1977 | Pedlow | 138/177 |
| 4,135,553 | 1/1979 | Evans et al. | |
| 4,283,447 | 8/1981 | Flynn | 138/137 |
| 4,508,863 | 4/1985 | Kauder et al. | 524/181 |
| 4,582,762 | 4/1986 | Onohara et al. | 138/DIG. 7 |
| 4,652,475 | 3/1987 | Haney et al. | 138/137 |
| 4,867,921 | 9/1989 | Stekette, Jr. | |
| 5,042,532 | 8/1991 | Gilleland | 138/98 |
| 5,102,263 | 4/1992 | Allen et al. | 138/97 |
| 5,109,046 | 4/1992 | Larkin et al. | 524/181 |
| 5,147,697 | 9/1992 | Ijyuin et al. | 138/98 |
| 5,186,215 | 2/1993 | Gilleland | 138/98 |

Primary Examiner—David A. Scherbel
Assistant Examiner—James F. Hook
Attorney, Agent, or Firm—Cumpston & Shaw

[57] ABSTRACT

A polymeric pipe lining composition consisting of 100 parts by weight of polyvinyl chloride, 0.5 to 3.5 parts of stabilizer, 5 to 30 parts of plasticizer, 0.4 to 2.0 parts of internal lubricant or wax, and 0.4 to 2.0 parts of external lubricant or wax. The composition is especially useful for in situ lining of sewers.

3 Claims, 1 Drawing Sheet

PIPE LINER COMPOSITION

This is a continuation-in-part of copending application Ser. No. 07/753,797 filed on Sep. 3, 1991, now abandoned.

BACKGROUND

1. Field of the Invention

This invention relates to polymeric compositions for lining pipe.

2. Description of the Prior Art

Pipe has been used in transporting water and other liquids for many centuries. Pipe is also used in the water transport of sewage, coal, ores and the like. The replacement of buried pipe used for such purposes is difficult, especially where there are existing networks of pipe, wiring and buildings and other structures which must not be disturbed. More recently it has been proposed to in situ line pipe now in service to avoid the problems associated with removal of damaged underground piping. Methods and apparatus for lining horizontal sections of sewer pipe are known, for example from U.S. Pat. No. 4,985,196, and the prior art referred to therein which is incorporated herein by reference. Unfortunately, the compositions for and methods of relining the pipe leaves much to be desired. Among other things, it is desirable to provide shorter installation times, lower temperature and lower installation pressures on the liner and better fit of the liner. Linings based on epoxy compositions typically require a 24 hour cure period prior to resuming use of the sewer pipe. Liners based on polyethylene compositions require higher temperature and pressures to obtain a reasonable installation. Failure to tightly fit the liner to the wall of the pipe allows for continued infiltrating of soil water and other runoff fluids into the pipe and eventually into the sewage treatment plant. A fully fitted liner avoids the extra load placed on sewage treatment plant by rain and the like.

Polyvinyl chloride (PVC) pipe currently being used as a pipe liner for sewer rehabilitation is in the form of a rigid thermoplastic PVC which has a flexural modulus of greater than 300,000 psi and a glass transition temperature of 70° C. and higher. A particular problem associated with the PVC pipe liners of the prior art occurs upon following the formation of the pipe liner by conventional extrusion processes and winding the pipe liner while still pliable onto rolls for storage. Upon cooling, the PVC becomes extremely stiff and cannot effectively be removed from the storage means or roll even at ambient temperatures of 70° or greater. It therefore becomes necessary that the rolled pipe liner in its stored condition must be heated at a temperature of approximately 300° F. and higher to make it flexible or pliable, and capable of being pulled off the storage roll and inserted into the pipe to be rebuilt. This heating step and the necessary equipment and the time involved in heating the pipe as it is unwound, adds significantly to labor coats and time in the overall completion of a typical pipe lining job. This particular prior art problem concerning the heating step and the equipment required in addressing this problem associated with conventional rigid PVC pipe is discussed in U.S. Pat. No. 4,867,921 which sets forth the necessary heating step and hardware required in order to remove such rigid PVC pipe from storage means prior to use. In addition, the conventional rigid PVC does not provide for optimum expansion upon heating, and therefore cannot provide the desired tight molded fit in all pipe relining applications.

Accordingly, it is an object of this invention to provide improved polymeric compositions for lining of pipe which overcome the disadvantages and short-comings of the prior art described above. These and other objects will become readily apparent to those skilled in the art upon reading of the following description.

SUMMARY OF THE INVENTION

In accordance with this invention there is provided a pipe lining polymeric composition consisting of 100 parts by weight of polyvinyl chloride, 0.5 to 3.5 parts of stabilizer, 20 to 27 parts of plasticizer, 0.4 to 2.0 parts of internal lubricant, and 0.4 to 2.0 parts of external lubricant.

This specially formulated polyvinyl chloride compound (PVC) has unique physical properties which allow it to be coiled wrapped on a storage reel and uncoiled without preheating at normal ambient temperatures in the range of about at least 70° F. The novel PVC compounds of the present invention have a flexural modulus from about 130,00 to 260,000 psi.

DESCRIPTION OF THE PREFERRED EMBODIMENTS

Figure 1:
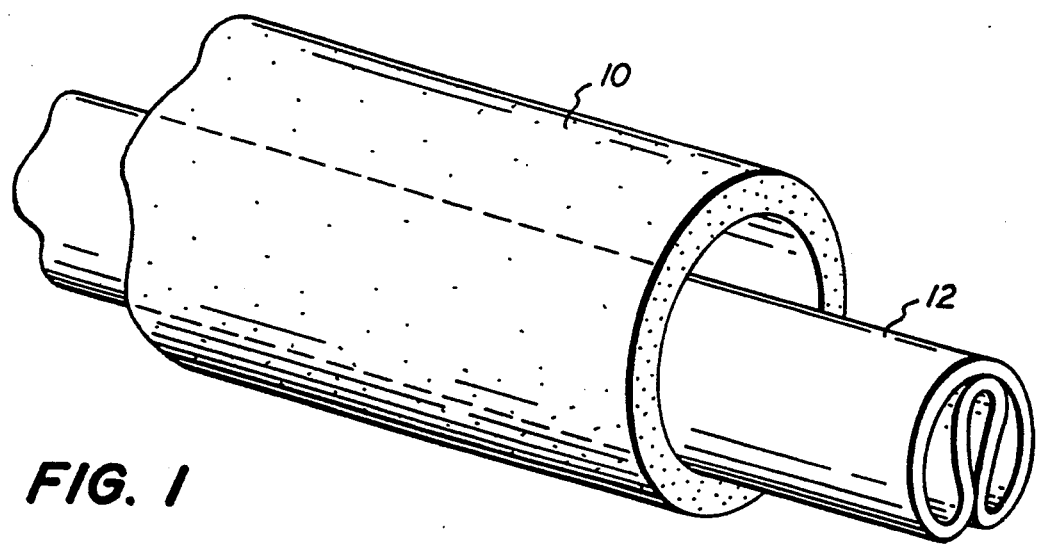
FIG. 1 is a perspective view of a piper liner of the present invention in a folded condition within a pipe to be lined.
Figure 2:
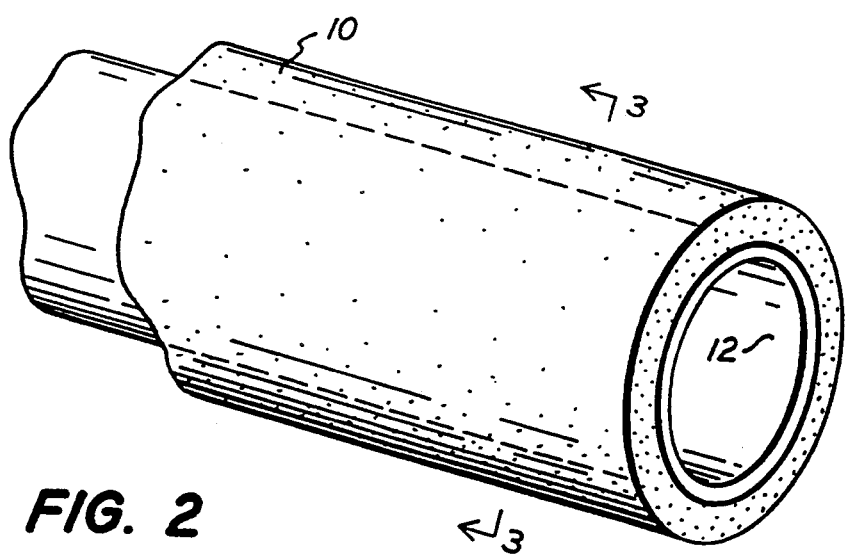
FIG. 2 is a perspective view of FIG. 1 with the liner in the fully expanded condition.
Figure 3:
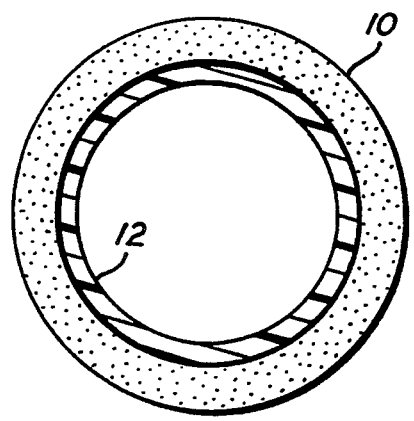
FIG. 3 is a sectional view of the pipe and liner along line 3—3 of FIG. 2.

The liner of the present invention is illustrated in FIG. 1 of the drawings where the liner 12 in the folded condition is positioned within a degraded pipe 10 which is to be relined. FIG. 2 illustrates the pipe 10 after the relining procedure has taken place with the liner 12 in the fully expanded condition. FIG. 3 is a cross-sectional view of the relined pipe along lines 3—3 of FIG. 2.

The present invention is directed to a specially formulated polyvinyl chloride compound (PVC) which has unique physical properties which allow it to be coiled wrapped in 900 foot rolls on a storage reel and uncoiled without preheating at normal ambient temperatures in the range of about at least 70° F. The novel PVC compounds of the present invention have a flexural modulus in the range of about 130,000 to 260,000 psi and a glass transition temperature of between about 40° C. to 70° C. These specially formulated PVC compounds allow for a significant degree of expansion when placed inside an existing pipe to be repaired, and because of their unique formulation provide a final tight molded fit against the walls of the existing pipe superior to any materials known in the art. Typically a 350 to 400 foot sewer line can be installed with this material in less than 2 hours because of its unique properties, while the comparable more rigid PVC referred to in the prior art, because of the stiffness and heating problem associated therewith, typically requires up to 9 hours to do the same job. Furthermore, the more rigid PVC of the prior art does not provide for the degree of expansion comparable to the PVC special formula of the present invention, and consequently cannot provide a tight molded fit in all pipe relining applications.

A broad formula range for compositions of the present invention which provide for a flexural modulus in the range of about 130,000 to 260,000 psi is as follows:

| INGREDIENTS | PARTS BY WEIGHT |
|---|---|
| Resin | 100 |
| Stabilizer | .5 to 3.5 |
| Plasticizer | 20 to 27 |
| Internal Lubricant | .4 to 2.0 |
| External Lubricant | .4 to 2.0 |

The pipe lining composition of this invention preferably has polyvinyl chloride (PVC) as the polymeric resin component. Preferably the PVC has an inherent viscosity, as measured by American Society for Testing Materials procedure ASTM D-1243, from about 0.88 to about 1.10 and more preferably from about 0.89 to about 0.92. In other embodiments, copolymers and homopolymers of PVC can be substituted for PVC as the resin component.

In keeping with the conventional formulation or compounding, the composition of this invention are expressed in terms of parts per 100 parts of resin (PHR).

The PVC compositions of this invention contain from about 0.5 to 3.5 PHR of a stabilizer. The preferred heat stabilizer is a primary stabilizer of the organotin type. The more preferred organotin stabilizers are comprised of organotin, mercaptides, organotin mercaptoacid esters and organotin mercaptoalcohol esters. Particularly suited to the present invention are alkyltin mecaptoester sulfides. More preferably the stabilizer is present in an amount from about 0.4 to about 1.0 PHR. For convenience of use the stabilizer may be dispersed in a liquid medium such as paraffin oil and then added to the PVC.

In preparing the PVC composition of this invention it is often advantageous to incorporate lubricants therein. These lubricants can be of the internal type, the external type or combinations of both types. The internal type, among other things, may lower the melt viscosity of the polymer without reducing its strength properties. The external type, of course, acts to reduce polymer friction with processing machinery. High melting paraffin waxes, polyethylene waxes, oxidized polyethylene waxes and mixtures thereof are examples of useful external lubricants may be employed in this invention. More preferably from about 0.4 to about 2.0 PHR of each type of lubricants will be present.

It is well known in the polymer processing industry that the processability of a polymeric composition varies from one piece processing of equipment to another piece of processing equipment and from geographic location to another. Accordingly, it is customary to vary the amount of processing aid present in the composition. In the present invention, the amount of process aid present can vary from zero to about 5 PHR without altering the essential characteristics of the present invention. Preferably, the process aid employed will be of the acrylic polymer type, which may optionally contain small amounts of surfactants. Certain of the process aids also have a lubricating property. Preferably both the process aid and the lubricating process aid will be present in an amount from about one to about three PHR.

As described above, the composition of the present invention also has from about 20 to 27 PHR of plasticizer. In this range, the plasticizer constitutes about 16% to 20% by weight of the composition. The plasticizer, which is relatively non volatile, among other things increases the flexibility and distensibility at low temperatures to the invention composition when in service as a pipe liner. The preferred plasticizer is an organic ester, more preferably the plasticizer is a polymeric type. Included within the definition of polymeric plasticizers are those which may be found in *Modern Plastics Encyclopedia* an annual publication of "Modern Plastics", McGraw Hill, New York, N.Y. which is incorporated herein by reference.

The solid plasticizer improves the ease of installation of the liner made from the compositions of this invention. The ease of installation is very important since this occurs wherever the existing installed sewer pipe may be. The solid plastizicer also makes possible a better and easier fit of the liner to the actual configuration of the sewer pipe.

A liner composition of this invention is prepared by charging to an internal mixer (a modified 600/1200 Littleford mixer and cooler) 100 parts of polyvinyl chloride (Formolon 622 from Formosa Plastics) followed 0.875 parts organotin stabilizer (Advastab ® TM-694, Morton Thiokol, Inc.). Then at a temperature of about 185°–190° F. (85°–88° C.) 0.4125 parts of internal lubricant (Petrac ® CP-11, DeSoto, Inc.), 1.3125 parts of external lubricant (paraffin/polyethylene wax blend) (Rheolub ® 315, Rheochem Manufacturing Co.), 1 part of lubricating process aid (acrylic polymer) (Paraloid ® K-175, Rohm and Haas Co.) and 2.78 parts of acrylic process aid with surfactant (Paraloid ® K-120N, Rohm and Haas Co.) are added. When the temperature of the batch reaches 235°–240° F. (113°–116° C.) the batch is discharged into the cooler. Then while the batch is cooling 26 parts of ethylene copolymer plasticizer (Elvaloy ® 742P, E. I. DuPont de Nemours & Co.) are added. The liner composition is blended until uniform and cooled to a temperature of 120°–125° F. and then discharged to a screw extruder.

The above pipe liner composition is discharged to twin screw extruder (Cincinnati Mitacton ™ CM-80) with an 8 inch (24.3 cm) SDR pin tip and bushing to produce the desired pipe liner. The pipe is pulled through a fixture that folds the liner. The folded liner is held in the desired shape while water is cooling the liner. After printing to identify size, etc. the liner is coiled on a reel and then is ready for use.

The pipe liner composition has the following properties:

| | ASTM Method | Value |
|---|---|---|
| Tensile Strength | D 639 | 3,500 psi |
| Tensile Elongation | D 638 | 150% |
| Tensile Modulus | D 638 | 155,000 psi |
| Flexural Modulus | D 790 | 145,000 psi |
| Specific Gravity | D 792 | 1.28 |
| IZOD Impact | D 256 | 1.2 ft. lbs./in. |
| Brittleness Point | D 746 | 32.9° F. |
| Glass Transition Point | | 60° C. |
| Coefficient of Linear Thermal Expansion | D 696 | 4.17 × 10 in./in. °F. |

A typical formulation falling within the scope of the present invention and which yields a flexural modulus of about 150,000 psi is as follows:

| INGREDIENTS | PARTS BY WEIGHT |
|---|---|
| Rein (Formolon 622 PVC) | 100 |
| Stabilizer (Advastab TM 694) | 1.313 |
| Internal Lubricant (Calcium Stearate) | .413 |
| External Lubrican (Wax 355 Hoechst Celanese) | 1.25 |

-continued

| INGREDIENTS | PARTS BY WEIGHT |
|---|---|
| Process Aid (Paraloid K-175) | 1.00 |
| Process Aid (Paraloid K-120 N) | 2.78 |
| Elvaloy 742P Plasticizer | 26.00 |
| U.V. Stabilizer (Titanium dioxide) | .5 |

A further advantage of the PVC formulation of the present invention over the more rigid and less flexible PVC of the prior art is that the formulation of the present invention exhibits a lower coefficient of linear thermal expansion and therefore can be installed at lower temperatures and pressure resulting in a smaller annulus space between the host pipe and the liner. This is reflected in a preferred tighter molded fit.

Because of the higher installation temperature (300° F. plus) required for the PVC of the prior art, this installation procedure requires the insertion of a heat containment tube into the host pipe followed by the insertion of the liner. The requirement of the heat containment tube is due to the higher installation temperature required in the PVC liner of the prior art. The prior art liner, because of its rigidity, also requires a separate heating unit contained in a truck, to enable the liner to be heated in order to unwind it from a storage roll. It has been established that the liner diameter shrinks upon cooling to ambient temperature according to the following formula:

$$D_1 - D_2 = a'D_1(T_1 - T_2)$$

Where:
$D_1$ = Inside diameter of host pipe, inches
$D_2$ = Final outside diameter of liner, inches
$a'$ = Linear coefficient of expansion, in/in ° F.
$T_1$ = Forming temperature of liner, ° F.
$T_2$ = Final temperature of linear, ° F.

The wall thickness, cooling rate, forming pressure, etc. do not effect the shrinkage of the liner. Thermal expansion/contraction occurs according to the formula. This was confirmed by two tests on various sizes of pipe liner of the present invention as compared to polyethylene liners of the prior art. The polyethylene liner of the prior art which was tested is sold under the trademark U-Liner by Pipe Liners Incorporated of New Orleans, La. There was good correlation between calculated and measured values. The formula of the present invention used in the comparative testing below is the formula in the table above which has a flexual modulus of 150,000 psi.

| Material | PVC (Invention) | Polyethylene (Prior Art) |
|---|---|---|
| Thermal coefficient, $a'$ | 0.00005 | 0.00014 |
| Forming temperature, $T_1$ | 212° F. | 235.4° F. |
| Final Temperature, $T_2$ | 63° F. | 63° F. |
| $T_1 - T_2$ | 149° F. | 172.4° F. |
| $a'(T_1 - T_2)$ | 0.0075 | 0.0241+ |

ANNULUS BETWEEN HOST PIPE AND LINER

| HOST PIPE INSIDE DIAMETER $D_1$ | PVC (INVENTION) $(D_1 - D_2)/2$ | POLYETHYLENE $(D_1 - D_2)/2$ |
|---|---|---|
| 4.0 | 0.015 | 0.048+ |
| 6.0 | 0.023 | 0.072+ |
| 8.0 | 0.030 | 0.096+ |
| 10.0 | 0.038 | 0.121+ |
| 12.0 | 0.045 | 0.145+ |
| 15.0 | 0.056 | 0.181+ |
| 18.0 | — | 0.217+ |
| 21.0 | — | 0.253+ |
| 24.0 | — | 0.289+ |

It can therefore be seen from the above formula that the higher the installation or forming temperature of the liner, the greater the expansion and contraction occurs, resulting in a larger annulus for higher installation temperatures.

The relatively lower installation temperature, i.e. about 212° F., for the liner formula of the present invention results in a preferred tighter fit due to the lower thermal coefficient of linear expansion temperature associated with a novel formulations of the present invention. The larger annulus would result in the more rigid and less flexible PVC liner of the prior art which require higher forming temperatures. As set forth above, the greater the annular space between the host pipe and the liner, the greater the tendency for the liner to collapse due to the seepage of ground water and other fluids into the annular space which increases the collapsing pressure on the liner.

The hydrostatic pressure on a liner of the present invention standing alone can withstand about 15–20 psi for an 8 inch pipe liner. When the pipe is expanded into a host pipe, this liner withstood approximately 120 psi before failure. This demonstrates that a liner with a tight fit in a host pipe gains structural support from the host pipe.

In one embodiment, a coil of pipe liner on a reel is positioned on the upstream end of the section of pipe to be repaired. A parachute type device attached to a rope is moved by vacuum downstream through the host pipe. The free end of the pipe liner is securely attached to the cable which has been placed in the host pipe by rope and parachute type device.

The pipe finer is pulled downstream through the host pressure to allow a snaked wire to pull an air hose and steam hose upstream through the liner. The air line is connected to a floating plug assembly which pipes air upstream of the plug. The steam line is attached to a perforated head on the downstream side of the plug. A cable is also attached to the downstream side of the plug. The steam is turned on and as the liner softens, the plug is pulled into the liner by the cable. The temperature of the steam and the air pressure on the upstream side of the plug will determine the particular formulation and ambient conditions.

The plug is pulled downstream as the liner is steam heated. The plug spreads the liner. As the plug is pulled downstream, compressed air is pressurized, molding and cooling the upstream side of the plug. After the liner is fully expanded in the host pipe, the plug assembly is removed. Then lateral services of the host pipe are cut by a remote cutter. The host pipe liner, e.g., sewer, is then put back into service.

Because of the invented composition's preferred properties, the in situ blow molding of the liner to the, host pipe size is readily accomplished. The manufacturer of the pipe liner when using the composition of the present invention is not burden with criticality of size because of this moldability. In other words, the pipe liner of the present invention is easily expanded to fit the host pipe, and therefore, in manufacturing the liner, the outer diameter can have more flexible tolerances than other liner materials such as polyethylene. The ease of moving the liner through the pipe and molding it to the pipe permits the sewer line being repaired and returned to service in 3 to 4 hours.

The formulation of the present invention provides a pipe liner which exhibits a combination of the following advantages which make it superior to epoxy; polyethylene and the current PVC liner of the prior art:

(a) relatively high flexural modulus and other desirable physical properties.

(b) ease of installation with respect to required apparatus, speed and safety.

(c) lower installation temperature which results in a fighter molded fit with the host pipe.

The foregoing examples and method have been described in the foregoing specification for the purpose of illustration and not limitation. Many other modifications mad ramifications will naturally suggest themselves to those skilled in the art based on this disclosure. These are intended to be comprehended as within the scope of this invention.

What is claimed is:

1. An elongated cylindrical liner for a degraded underground pipe which is adapted to be installed in a collapsed form and expanded to intimately engage an inside surface of the degraded pipe, said liner having an outside diameter in the range from about 4.0 to 15.0 inches and having the following composition:

|  | Parts by Weight |
| --- | --- |
| PVC | 100 |
| Stabilizer | 0.5–3.5 |
| Plasticizer | 20–27 |
| Internal Lubricant | 0.4–2.0 |
| External Lubricant | 0.4–2.0 | with said pipe liner being semi-rigid and having a flexural modules in the range of about 130,000–260,000 psi.

2. An elongated cylindrical liner for a degraded underground pipe which is adapted to be installed in a collapsed form and expanded to intimately engage an inside surface of the degraded pipe, said liner having an outside diameter of at least about 4.0 inches and having the following composition:

|  | Parts by Weight |
| --- | --- |
| PVC | 100 |
| Stabilizer | 0.5–3.5 |
| Plasticizer | 20–27 |
| Internal Lubricant | 0.4–2.0 |
| External Lubricant | 0.4–2.0 | with said pipe liner being semi-rigid and having a flexural modulus in the range of about 130,000–260,000 psi.

3. A pipe having an internal diameter in the range of about 4.0 to 15.0 inches lined with a polymeric material having the following composition:

|  | Parts by Weight |
| --- | --- |
| PVC | 100 |
| Stabilizer | 0.5–3.5 |
| Plasticizer | 20–27 |
| Internal Lubricant | 0.4–2.0 |
| External Lubricant | 0.4–2.0 | with said pipe liner being semi-rigid and having a flexural modulus in the range of about 130,000–260,000 psi, and the annulus between the pipe and the liner being in the range of about 0.015 to 0.056 inches.

* * * * *

UNITED STATES PATENT AND TRADEMARK OFFICE
CERTIFICATE OF CORRECTION

PATENT NO. : 5,385,173
DATED : January 31, 1995
INVENTOR(S) : Joseph L. Gargiulo It is certified that error appears in the above-indentified patent and that said Letters Patent is hereby corrected as shown below:

In Column 3, line 30, please delete "mecaptoester" and insert in its place --mercaptoester--;
In Column 3, line 45, after "lubricants" insert --which--;
In Column 3, line 50, after "piece" insert --of--;
In Column 3, line 50, after "processing" delete "of";
In Column 4, line 37, after "to" insert --the--;
In Column 5, line 50, delete "flexual" and insert --flexural--;
In Column 6, line 22, delete "a" and insert --the--;
In Column 6, line 45, delete "finer" and insert --liner--;
In Column 6, line 46, delete "pressure" and insert --pipe--;
In Column 6, line 66, after "the" delete ",";
In Column 7, line 1, delete "critically" and insert --criticality--;
In Column 7, line 14, delete ";" and insert --,--;
In Column 7, line 21, delete "fighter" and insert --lighter--; and
In Column 7, line 26, delete "mad" and insert --and--.

Column 8,

In Claim 1, line 9, delete "modules" and insert --modulus--.

Signed and Sealed this

Nineteenth Day of September, 1995

Attest:

BRUCE LEHMAN

Attesting Officer

Commissioner of Patents and Trademarks